(12) United States Patent
Herzberg et al.

(10) Patent No.: US 11,969,768 B2
(45) Date of Patent: Apr. 30, 2024

(54) WASHER PEELER CLEANING SYSTEM

(71) Applicant: Vanmark Equipment, LLC, Creston, IA (US)

(72) Inventors: Alexander C. Herzberg, Prescott, IA (US); Floyd Richardson, Creston, IA (US); Josh Thompson, Creston, IA (US)

(73) Assignee: Vanmark Equipment, LLC, Creston, IA (US)

( * ) Notice: Subject to any disclaimer, the term of this patent is extended or adjusted under 35 U.S.C. 154(b) by 149 days.

(21) Appl. No.: 17/476,973

(22) Filed: Sep. 16, 2021

(65) Prior Publication Data

US 2022/0080467 A1 Mar. 17, 2022

Related U.S. Application Data

(60) Provisional application No. 63/079,522, filed on Sep. 17, 2020.

(51) Int. Cl.
| | |
|---|---|
| *B08B 3/02* | (2006.01) |
| *A23N 7/02* | (2006.01) |
| *A23N 12/02* | (2006.01) |
| *B05B 1/20* | (2006.01) |
| *B05B 13/04* | (2006.01) |
| *A23N 7/00* | (2006.01) |

(52) U.S. Cl.
CPC ............. *B08B 3/024* (2013.01); *A23N 7/02* (2013.01); *A23N 12/023* (2013.01); *B05B 1/20* (2013.01); *B05B 13/041* (2013.01); *B05B 13/0436* (2013.01); *A23N 2007/007* (2013.01); *A23N 12/026* (2013.01)

(58) Field of Classification Search
CPC ...... A23N 12/023; A23N 7/02; A23N 12/026; A23N 2007/007; B08B 3/024; B05B 1/20; B05B 13/041; B05B 13/0436
See application file for complete search history.

(56) References Cited

U.S. PATENT DOCUMENTS

| | | | |
|---|---|---|---|
| 2,139,180 A | 12/1938 | Urschel | |
| 2,249,787 A | 7/1941 | Savage | |
| 2,472,460 A | 6/1949 | Banks | |
| 2,477,006 A | 7/1949 | Pierson | |
| 2,548,798 A | 4/1951 | Irons | |
| 3,106,731 A * | 10/1963 | Garriott | ................. A23N 12/02 15/3.13 |
| 3,158,187 A | 11/1964 | Smith et al. | |
| 3,420,286 A * | 1/1969 | Vanhoegaerden | ........ A23L 5/57 426/520 |

(Continued)

*Primary Examiner* — Benjamin L Osterhout
(74) *Attorney, Agent, or Firm* — Jason H. Foster; Kremblas & Foster (57) ABSTRACT

An apparatus for cleaning a food-processing machine having cylindrical rolls disposed along a curve, each of the rolls having a peripheral working surface for contacting food products and an axis about which each roll rotates. A drive rail is mounted parallel to the axes of the rolls and extends the length of the rolls. A spray bar slidably mounts to the drive rail, extends adjacent the rolls, and has at least one nozzle for spraying liquid onto the working surfaces of the rolls to clean them of debris. A prime mover drives the spray bar along the drive rail parallel to the axes of the rolls while spraying the rotating rolls.

7 Claims, 6 Drawing Sheets

(56) References Cited

U.S. PATENT DOCUMENTS

| | | | |
|---|---|---|---|
| 3,602,280 A | | 8/1971 | Hill et al. |
| 3,745,914 A | | 7/1973 | Wallace |
| 4,132,162 A | | 1/1979 | Magnuson |
| 4,221,228 A | | 9/1980 | Stoffel et al. |
| 4,237,782 A | | 12/1980 | Bichel |
| 4,705,055 A | | 11/1987 | Rohm et al. |
| 5,125,515 A | * | 6/1992 | Bushman .............. B07B 13/065 209/663 |
| 5,146,848 A | | 9/1992 | Dufour |
| 5,386,765 A | | 2/1995 | Olusczak et al. |
| 5,451,266 A | * | 9/1995 | Kirk .................... A23N 12/023 426/333 |
| 5,632,907 A | | 5/1997 | Norbury |
| 5,775,348 A | | 7/1998 | Rush et al. |
| 5,918,610 A | * | 7/1999 | Tate .......................... B08B 3/14 134/61 |
| 6,426,107 B1 | | 7/2002 | Thomas et al. |
| 6,612,226 B2 | | 9/2003 | Schrader et al. |
| 8,870,632 B2 | | 10/2014 | Vedsted et al. |
| 10,681,933 B2 | | 6/2020 | Sorenson et al. |
| 2005/0082144 A1 | | 4/2005 | Maupin et al. |
| 2016/0353791 A1 | * | 12/2016 | Mathues ................. A23N 7/02 |
| 2018/0249754 A1 | * | 9/2018 | DeVito .................. B08B 3/022 |
| 2019/0255792 A1 | | 8/2019 | Lear |

* cited by examiner

WASHER PEELER CLEANING SYSTEM

BACKGROUND OF THE INVENTION

The invention relates generally to systems used in a peeling and cleaning apparatus for food products, and more specifically to a cleaning system used to clean the cylindrical and rotatable rolls and/or brushes of a vegetable peeling and/or cleaning apparatus.

Vegetable peelers/cleaners are well known, as shown in U.S. Pat. No. 10,143,227, which is incorporated by reference herein. Such peelers have cylindrical rolls with peripheral working surfaces. The rolls may be metal with an abrasive (e.g., knurled) working surface on the periphery thereof, or they may be stiff-bristled brushes with tips that form the working surface. Both types of rolls rotate about a longitudinal axis as driven by a common drive system. The drive system may be a chain or belt powered by a motor, causing all rolls to rotate at the same speed and in the same direction. The rolls are often disposed along a curve that may be U-shaped or J-shaped when viewed along the axes of the rolls to create a bed in which vegetables, such as potatoes, beets, onions, carrots, or any other food product may be placed.

In one example, as potatoes are fed into one end and the rolls are rotated, the potatoes are peeled and/or cleaned as they are conveyed along the length of the array of rolls in the chamber formed by the working surfaces of the rolls arranged in a curve. The potatoes that flow out of the opposite end are cleaned of any dirt or debris, and may have some or all of the skin removed therefrom.

In the process of cleaning and/or peeling potatoes or other vegetables, the rolls become filled with dirt, skin and other debris, which reduces the effectiveness of the rolls for subsequent vegetables. Traditionally, dirty rolls are cleaned by a person who opens the cover of the machine and power washes the rolls to remove the debris. Because the safety mechanisms of modern peelers prevents the rolls from being rotated while the safety covers of the machine are not closed, it can be time-consuming to thoroughly clean the rolls using the conventional cleaning means and process. There is a need for a cleaning system that permits complete and consistent cleaning of the rolls.

SUMMARY OF THE INVENTION

Disclosed herein is an apparatus for cleaning multiple cylindrical rolls that are disposed along a curve that has at least a bottom side and a lateral side. Each of the rolls has a peripheral working surface and a longitudinal axis about which each roll is configured for rotation. The apparatus comprises a spray bar disposed adjacent at least one of the sides of the curve. The spray bar has at least one nozzle directed toward the rolls that is configured for spraying liquid toward at least one of the working surfaces of the rolls. At least one prime mover is drivingly linked to the spray bar for displacing the spray bar along the longitudinal axes of the rolls.

In some embodiments, the apparatus further comprises at least one drive rail aligned substantially parallel to the longitudinal axes of the rolls. In some embodiments, the at least one drive rail extends from about a first end of the rolls to about a second, opposite end of the rolls.

In some embodiments, the apparatus further comprises a stationary upper nozzle disposed above the rolls in operable orientation. In some embodiments, the at least one drive rail is disposed adjacent the bottom side of the curve and the spray bar is disposed adjacent the lateral side of the curve.

In some embodiments, the at least one drive rail comprises first and second drive rails. In some embodiments, the spray bar is slidably mounted to the first and second drive rails and extends adjacent at least the bottom side and the lateral side of the curve.

Disclosed herein is an apparatus for cleaning a food-processing machine having multiple cylindrical rolls disposed along a curve that has at least a bottom side and a lateral side. Each of the rolls has a peripheral working surface configured for contacting food products and a longitudinal axis about which each roll is configured for rotation. The apparatus comprises at least one drive rail mounted to the food-processing machine that is aligned substantially parallel to the longitudinal axes of the rolls. The at least one drive rail may extend from about a first end of the rolls to about a second, opposite end of the rolls. A spray bar is slidably mounted to the at least one drive rail and extends to adjacent at least one side of the curve. The spray bar has at least one nozzle that is in fluid communication with a source of liquid and is directed toward the rolls for spraying liquid onto the peripheral working surfaces of the rolls on the at least one side of the curve. At least one prime mover is drivingly linked to the spray bar for displacing the spray bar along the at least one drive rail on a path substantially parallel to the axes of the rolls.

In some embodiments the apparatus further comprises a stationary upper nozzle disposed above the rolls in operable orientation. In some embodiments, the at least one drive rail is disposed adjacent the bottom side of the curve and the spray bar is disposed adjacent the lateral side of the curve. In some embodiments the at least one drive rail comprises first and second drive rails. In some embodiments, the spray bar is slidably mounted to the first and second drive rails and extends adjacent at least the bottom side and the lateral side of the curve.

Disclosed herein is a method of cleaning multiple cylindrical rolls disposed along a curve that has at least a bottom side and a lateral side. Each of the rolls has a peripheral working surface and a longitudinal axis about which each roll is configured for rotation. The method comprises disposing a spray bar adjacent at least one of the sides of the curve. The spray bar has at least one nozzle that is in fluid communication with a fluid source and is directed toward the rolls. The method also comprises spraying liquid from the nozzles toward and onto at least one of the working surfaces of the rolls. The method also comprises displacing the spray bar along the length of the rolls.

In some embodiments, the method further comprises displacing the spray bar while simultaneously spraying liquid from the nozzles. In some embodiments, the method further comprises rotating the cylindrical rolls about their longitudinal axes while simultaneously displacing the spray bar while simultaneously spraying liquid through the nozzles.

Disclosed herein is a cleaning system for a vegetable peeler, typical conventional examples of which are described in the Background portion of U.S. Pat. No. 10,143,227. The system disclosed herein is for assisting in the cleaning of a washer/peeler having an array of cylindrical rolls rotating about their longitudinal axes. The apparatus comprises a spray bar extending along at least one side of the array of rolls, the spray bar having at least one nozzle in fluid communication with a source of liquid and directed toward the rolls for spraying liquid on the rolls. At least one prime mover is drivingly linked to the spray bar for displacing the spray bar along the length of the array of rolls.

Disclosed herein is a method of cleaning a washer/peeler having an array of cylindrical rolls rotating about their axes. The method comprises disposing a spray bar along at least one side of the array of rolls, the spray bar having nozzles directed toward the rolls. Liquid is sprayed through the nozzles onto the rolls and the spray bar is displaced along the length of the array of rolls.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

U.S. Provisional Patent application Ser. No. 63/079,522 filed Sep. 17, 2020, which is the claimed priority application, is incorporated in this application by reference.

Figure 1:
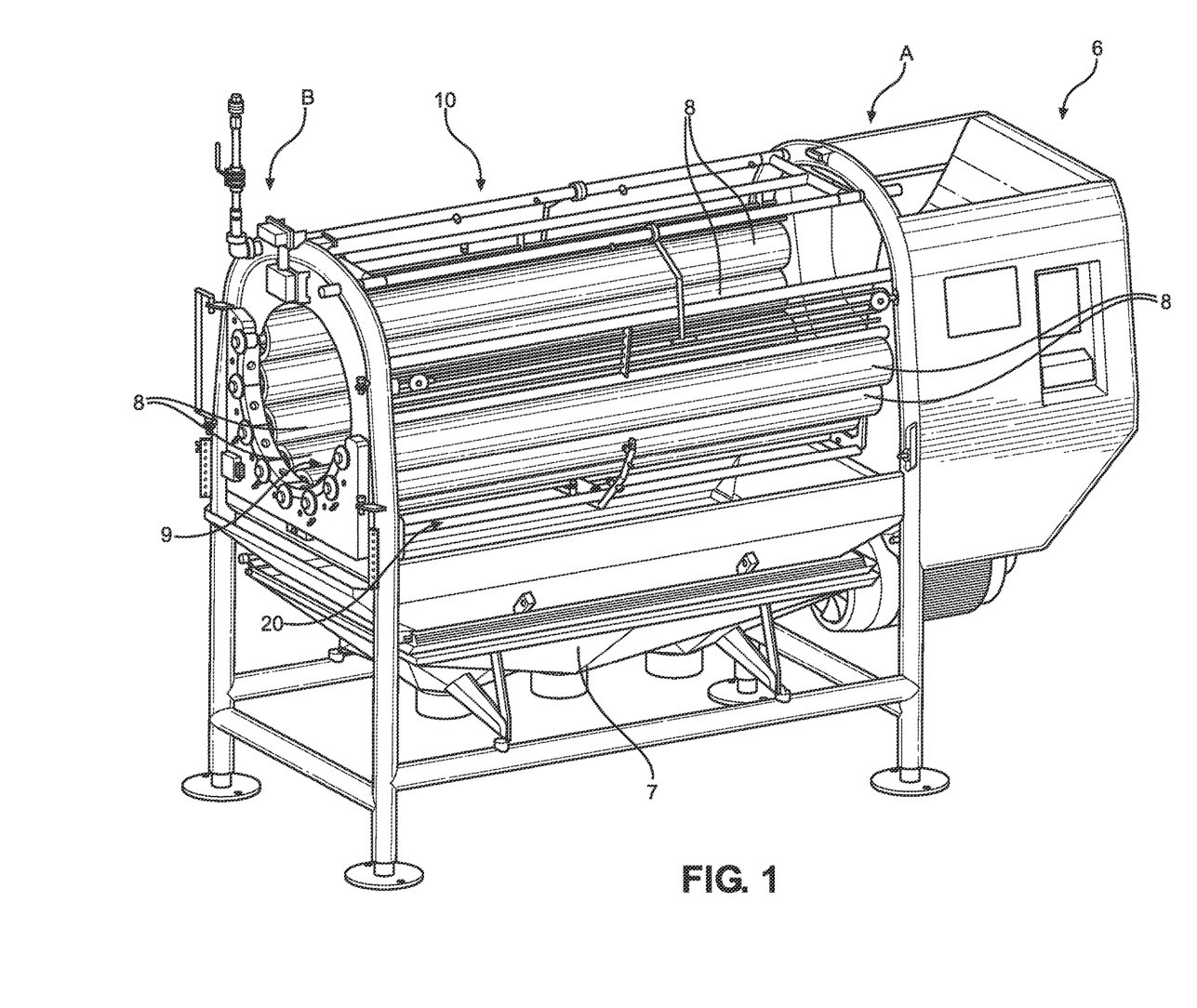
FIG. 1 is a view in perspective illustrating a conventional peeler/washer apparatus with an embodiment of the present invention mounted thereto.

FIG. 1 shows a conventional peeler/washer 6 with the addition of an embodiment of the present invention. In the relevant portion of the peeler/washer 6, multiple cylindrical peeler rolls 8 are shown. Each of these rolls 8 has a longitudinal axis around which the respective roll rotates rapidly during use to remove skin, dirt or both from vegetables, such as potatoes. Each roll 8 has a working surface at its periphery that contacts the food products, and these may be the tips of brush bristles or continuous or knurled surfaces of metal cylinders.

Figure 6:
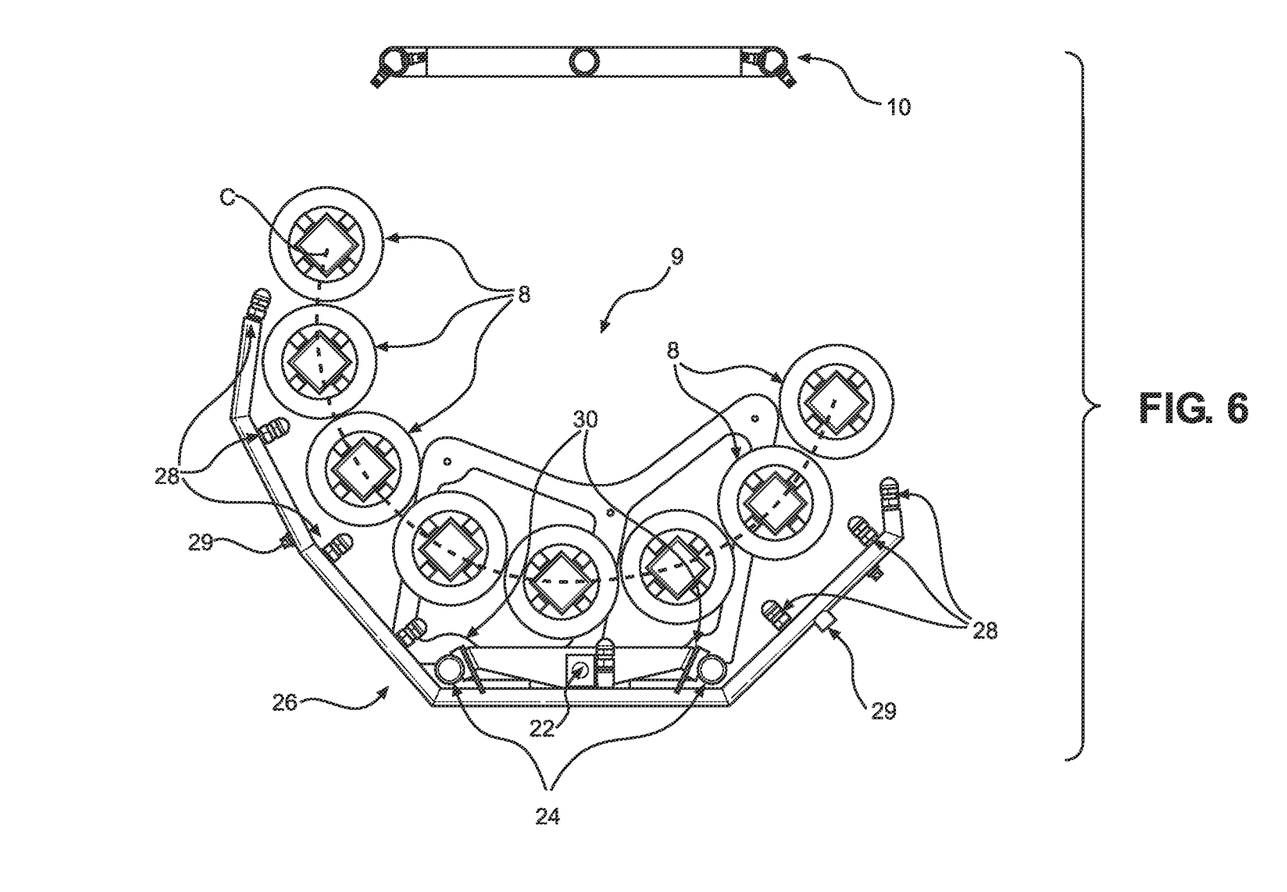
FIG. 6 is an end view of the embodiment of FIG. 2 viewed from the left end of FIG. 2.

The rolls 8 are aligned with one another so their axes are parallel, and their axes are aligned along a curve, such as a U-shaped curve or a J-shaped curve (when viewed from the end, as in FIG. 6). The working surfaces of the rolls 8 form a U-shaped or J-shaped chamber 9 defined within and above the working surfaces of the array of rolls 8 in operable orientation as shown in FIG. 1. When the rolls 8 are driven to rotate about their axes, vegetables and/or other food products are introduced into one end A (FIG. 1), which may be the infeed end. Because of the movement of the rolls 8, the food products are moved by, and thereby traverse, the rolls 8 during cleaning/peeling. Thus, the vegetables flow along the peeler/washer 6 in a direction from right to left in FIG. 1 so the vegetables reach the opposite end B, which may be the discharge end. At this point the vegetables are removed from the chamber 9 peeled and/or cleaned as desired.

Figure 2:
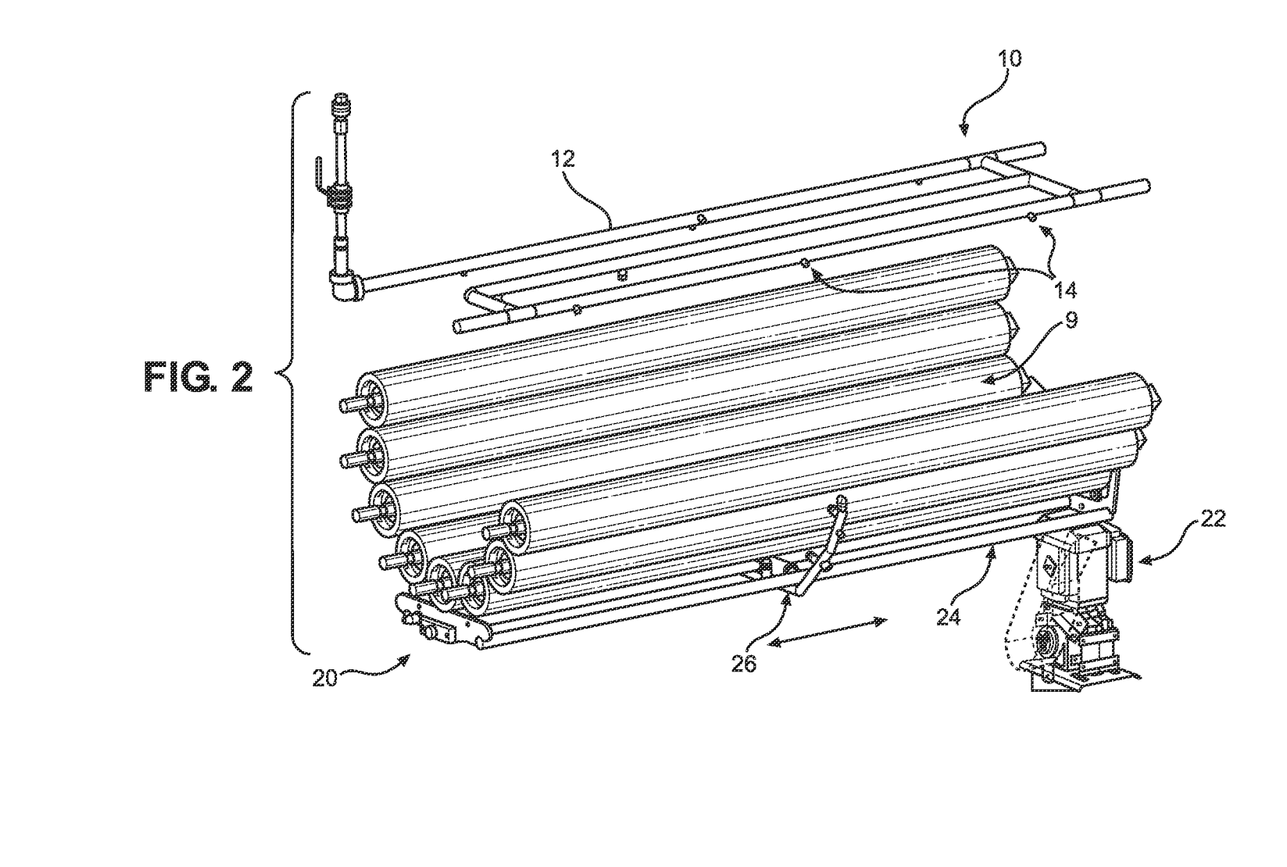
FIG. 2 is a schematic view in perspective illustrating an embodiment of the present invention with many components of the conventional peeler of FIG. 1 omitted for clarity.

The peeler 8 has an advantageous cleaning apparatus attached thereto. An upper spray bar assembly 10 and a lower spray bar assembly 20 are mounted to the peeler 6, as shown in FIG. 1, but any acceptable mounting is contemplated. As shown with most of the elements of the peeler 6 omitted in FIG. 2 for the purpose of visibility, the upper spray bar assembly 10 has no moving components other than the liquid that flows therethrough. The upper spray bar assembly 10 includes stationary tubes 12 that may be mounted above the rolls 8 to the housing or frame of the peeler/washer 6 when in an operable position as shown in FIG. 1. The upper spray bar assembly 10 is optional and may clean the sheet metal and other surfaces around the peeling rolls 8 with a series of spray nozzles 14 of specific spray patterns and orientations to reach important areas. The upper spray bar assembly 10 cleans most of the peeler/washer 6 housing and frame, causing water and peel residue to run down vertical surfaces and into a drain pan 7 at the bottom of the housing. After any material enters the drain pan 7, it is preferably conveyed to a disposal site by being pumped or by gravity.

The lower spray bar assembly 20 has components that may be disposed in the lower regions of the peeler/washer 6 (in the operable orientation of FIG. 1), and the purpose of the lower spray bar assembly 20 is to clean the peeling rolls 8. The lower spray bar assembly 20 includes at least a drive unit 22, drive rails 24, a spray bar 26 and sensors (not shown). The drive unit 22 is preferably a prime mover, which may be a pneumatic ram or a servo motor, such as a rotary drive motor with a rotatable shaft that may be linked to a threaded shaft, a belt drive mechanism or any suitable drive system. Any suitable prime mover and drive system may be used. For example, the drive unit 22 may drive a threaded shaft in rotary motion, and a threaded aperture may be formed in a component that is desirably driven longitudinally after being threaded onto the shaft. The threaded shaft may be aligned parallel to the axes of the rolls 8. Alternatively, a shaft with cogs may be driven to move a cogged belt that extends around the shaft and a component that is desirably driven longitudinally.

The drive unit 22 may be controlled automatically, such as by a programmed computer that is connected to the drive unit 22 by wires or wirelessly. Alternatively, the drive unit 22 may be controlled manually by an operator to function as further described herein. The drive unit 22 may manually, or as programmed, drive the spray bar 26 to traverse the length of the rolls 8 one or more times, or until a sensor indicates sufficient cleaning has been accomplished.

The spray bar 26 is a generally U-shaped member that extends laterally beneath and around the outside of the array of rolls 8 disposed in a curved arrangement as shown in FIG. 6 from an end view of the peeler/washer chamber 9. In FIG. 6, the rolls 8 are disposed along a curve, C (FIG. 6 shown in a dashed line), with one side that is higher and could be considered J-shaped having a base side and opposing lateral sides of varying size. In this case, the left side of the spray bar 26 extends higher than the right side to accommodate the lateral side of the J-shaped curve of the rolls 8. The spray bar 26 is generally U-shaped (it has a base and two legs extending up opposite sides) to accommodate the shape of the rolls 8, even though one side of the U is taller than the opposite side. Preferably the spray bar 26 is adjacent and in close proximity to the working surfaces of the rolls 8, as shown in FIG. 6, and positions the nozzles 28 in even closer proximity to the rolls 8 than the bar of the spray bar 26.

The spray bar 26 has bearings 30 that are supported on the drive rails 24 to permit smooth relative movement between the spray bar 26 and the drive rails 24. The drive rails 24 are smooth, preferably hollow cylindrical bars that are rigidly attached to the peeler 6 housing or frame and extend substantially parallel to the axes of the rolls 8. The drive rails may alternatively be a different shape than shown, such as an I-beam or rectangular tubing, as the person having ordinary skill will understand. The drive rails 24 may be disposed below the lowest of the rolls 8 in the operable position shown in FIG. 6. The spray bar 26 may thus be driven along the length of the drive rails 24 by the drive unit 22 with little resistance to movement. The threaded drive shaft of the drive unit 22 may extend through a threaded aperture 22' as shown in FIG. 6 so that when the drive unit 22 is actuated, the threaded shaft rotates, thereby displacing the spray bar 26 longitudinally and substantially parallel to the rolls 8.

The longitudinal movement of the spray bar 26 may be in a cycle that begins at or near one end, which may be considered to be a "home" for the spray bar 26. The cycle may include essentially the entire length of the rails 24 to the opposite end, and then the spray bar 26 returns to or near the "home" starting point. This cyclical movement may occur during normal operation of the peeler/washer 6, or during a separate cleaning cycle. It is preferred that the cleaning cycle occurs when any doors on the housing of the peeler/washer 6 are closed, in the same way as during normal operation, to permit rotation of the rolls 8 and thereby more effectively and efficiently clean the rolls 8.

The spray bar 26 may be constructed of hollow metal, plastic or any other suitable material tubes through which water or a liquid cleaning solution may flow under pressure higher than atmospheric pressure. The cleaning fluid may enter the spray bar 26 through one or more of the connectors 29 (see FIG. 6) that may be in fluid communication with supply hoses (not visible) having high pressure cleaning fluid therein. Spray nozzles 28 of a desired type, size, and spray pattern may be mounted at spaced intervals along the spray bar 26 and in close proximity to the rolls 8, such as within one to three inches of each roll 8 that the respective nozzle is intended to spray. The nozzles 28 are preferably in fluid communication with the fluid in the spray bar 26, and/or any other liquid source, such as a pump and reservoir of liquid cleaning fluid. As an alternative, the liquid source may be a reservoir and a pump connected to the nozzles 28 through external hoses or other conduit rather than passing through the components of the spray bar 26. The nozzles 28 are disposed on the spray bar 26 relative to the working surfaces of the rolls 8 in a manner that provides optimum cleaning of the rolls 8 when the liquid is sprayed out of the nozzles 28 under high pressure. The nozzles 28 point their respective liquid outlets directly at the adjacent rolls 8 in order that spray emitted from the nozzles 28 contacts the working surfaces of the rolls 8 and removes any foreign particles, liquids, and any other matter undesirably attached to the rolls 8.

Figure 3:
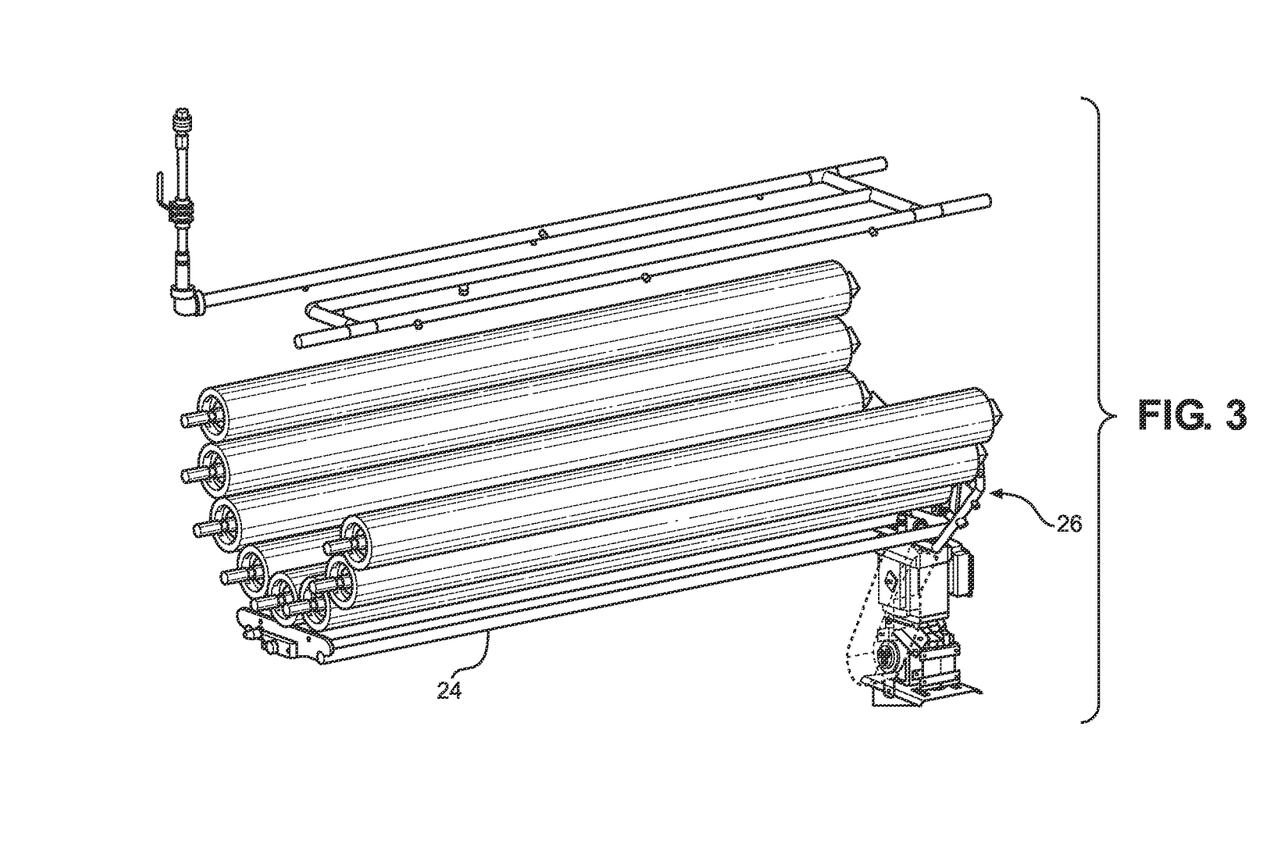
FIG. 3 is a schematic view in perspective illustrating the embodiment of FIG. 2 with the spray bar in the home position near the infeed end of the peeler.
Figure 4:
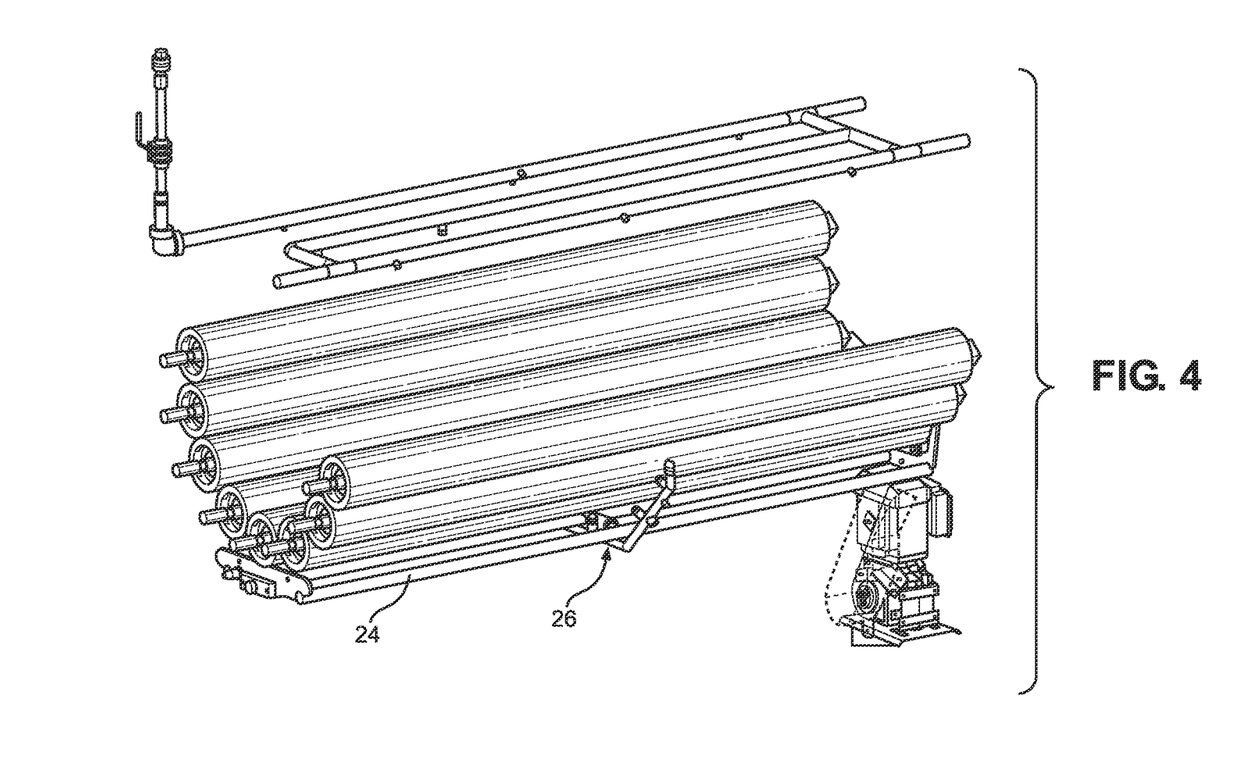
FIG. 4 is a schematic view in perspective illustrating the embodiment of FIG. 2 with the spray bar in an intermediate position of the peeler.

The spray bar 26 may be stored at a "home" position, as shown in FIG. 3, which may be confirmed by a position sensor (not shown but conventional and connected to the computer) located near one end of the peeler/washer 6. The home position may be the infeed end A where vegetables enter the chamber 9 of the peeler/washer 6. When a wash cycle is initiated, the spray bar 26 begins its travel from the home position shown in FIG. 3 and travels toward the opposite end along the drive rails 24, which are preferably substantially parallel (within about 10 degrees) to the axes of the rolls 8. During its travel in this direction, the spray bar 26 may eventually be disposed intermediate the home position and the opposite end, as shown in FIG. 4. Upon travelling farther, the spray bar 26 reaches the opposite, discharge end B of the peeler 6, which corresponds with the opposite end of the peeling rolls 8. At this time, the position of the spray bar 26 may be confirmed with another position sensor (not shown but conventional and connected to the computer) that provides a signal to the controlling computer that results in the drive unit 22 causing the spray bar 26 to change direction and return to the home position.

Figure 5:
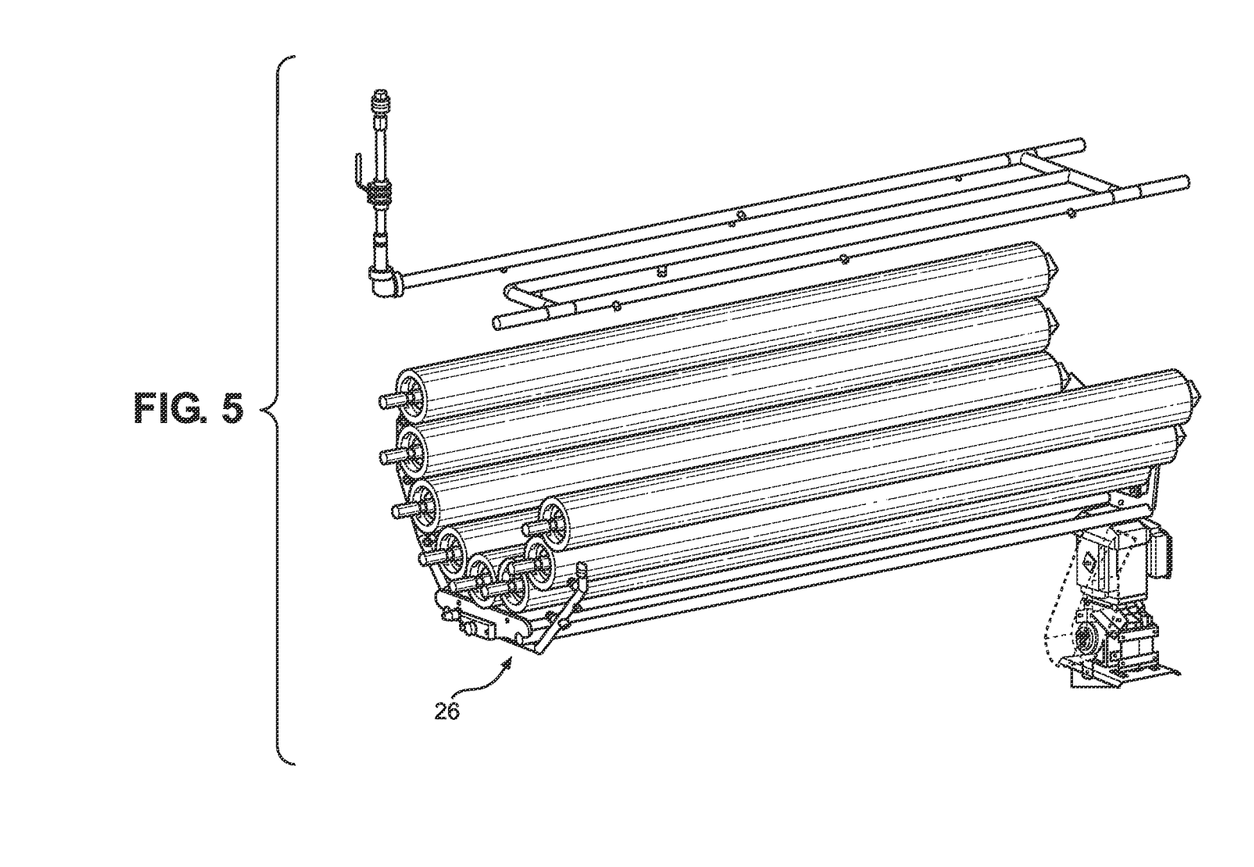
FIG. 5 is a schematic view in perspective illustrating the embodiment of FIG. 2 with the spray bar in a position near the outfeed end of the peeler.

The spray bar 26 preferably emits a high pressure spray of cleaning fluid from some or all of the nozzles 28 toward the peeling rolls 8 during its entire, or any selected portion of the, time of travel from the home position to the opposite end of the peeler 6 (shown in FIG. 5) and then back to the home position shown in FIG. 3. In a preferred embodiment, the cleaning fluid's pressure and spray pattern are sufficient to remove most or all foreign matter from the rolls 8. The nozzles are preferably in close proximity to the associated rolls 8, such as within one-half inch to two inches, but as much as 12 inches with sufficient pressure or volume of cleaning liquid being sprayed. When the spray bar 26 sprays liquid and moves along the length of the rolls 8, the rolls 8 are preferably driven in a convention manner to rotate about their axes at the same speed as during cleaning/peeling the food products. In an alternative embodiment, the rolls 8 rotate at a lower speed, and in another alternative the rolls 8 rotate at a higher speed. In another embodiment, the speed of the rolls 8 varies during cleaning. In a preferred embodiment, the rolls 8 rotate about their axes at normal speed during the entire time that the spray bar 26 is moving along the length of the rolls 8 and the spray bar 26 is driven at a speed that permits the spray from the nozzles to reach all sides of the rolls 8 at each longitudinal position of the rolls 8 at least once per cycle, and possibly more than once per cycle.

The cleaning apparatus thus cleans the rolls and chamber walls while the rolls 8 are spinning and the peeler/washer 6 safety doors are closed, thereby maintaining compliance with safety regulations that prohibit access to the rolls during operation. The cleaning apparatus is able to clean each roll 8 and surrounding drain pan surfaces. It will be understood by the person of ordinary skill from the description herein that any number of cycles of movement of the spray bar 26 may be effected during the cleaning process, and that the speed of such cycles may be modified to suit a particular type of roll and the product that the machine previously peeled/cleaned.

The control system of the apparatus is not pictured, but preferably includes a computer that is linked to the drive unit 22 and sensors to control at least the starting position, stopping position, speed of travel of the spray bar 26 and direction of movement of the spray bar 26 by the drive unit 22. The computer is preferably programmed to be operated manually (by a human operator) and/or automatically to actuate the drive unit 22 to drive the spray bar 26 a predetermined amount of times or number of cycles, or to receive data from sensors and actuate the drive unit 22 based upon the received data.

The control system for the cleaning system may include a touchscreen Human-Machine Interface (HMI) that allows a user to operate the system using touchscreen actuation. From the HMI, the user can start and stop the cleaning system, view system status, and program various washing routines of varying wash times, speeds, and frequencies. This allows users to determine the ideal settings for their application and water use. The system is also compatible with periodic caustic cleaning solutions for heavy cleaning and sanitation purposes.

The above-described cleaning system provides many advantages over traditional cleaning methods and apparatuses. It allows the rolls and peeling chamber to be cleaned while the rolls are rotating and the peeling/washing machine doors are closed, thereby maintaining compliance with safety regulations. It also completes the cleaning process consistently and effectively, rather than depending on inconsistent human judgment. The automated system removes variability attributed to the human processes of cleaning the machine leading to greater efficiency, effectiveness, and ensuring the process is completed as scheduled. Some traditional cleaning methods aren't able to clean all of the rolls and only directly spray the rolls positioned near the bottom of the "J" or "U"-shaped peel bed. The cleaning apparatus disclosed herein is able to clean each roll and optionally the surrounding surfaces. Using the frequency, speed, and wash time settings, users can minimize their water usage over traditional systems. Because the apparatus incorporates a travelling bar, fewer nozzles are required resulting in less water used per unit time.

The above-described embodiment is an example of the invention, and others will be apparent to the person of ordinary skill from the disclosure. For example, the cleaning system described above is shown mounted to a particular peeling/washing apparatus, but may be used in different peeling/washing machines. A person having ordinary skill will understand from the description how to modify the embodiment to accommodate different parameters of a different peeling/cleaning machine. For example, some peeling/washing machines have multiple peel/wash chambers in a single machine. In such a machine, two of the above cleaning systems may be used, with one cleaning system per peel/wash chamber. Alternatively, a single cleaning system may be used in two chambers, for example if one system extends from one extreme end of a first peel/wash chamber to the opposite extreme end of the second peel/wash chamber. Such a configuration is able to clean the rolls in both chambers of the same machine with one cleaning system. Of course, a cleaning system could be adapted to extend along and clean more than two chambers in a single machine. Furthermore, the illustrations only show a single peel chamber to describe the cleaning system, but the cleaning system described above could be adapted to be used on peeling/washing machines of similar, but still different, configurations, and these different configurations may have a single chamber or more than one chamber. Such different configuration machines also may have a more U-shaped roll configuration, a J-shaped roll configuration or other configurations. Therefore, it will be apparent to a person of ordinary skill from the description herein to adapt the described cleaning system to any other peeling/washing machine with rotating rolls.

The upper spray bar assembly 10 is static while the lower spray bar assembly 20 has components that may travel along the entire length of the peeling rolls 8. The cleaning apparatus may be fitted into new or old peelers and applied to most models of peeler/scrubber/washer machines.

The upper spray bar assembly 10 may be incorporated with a standard process spray bar that sprays liquid on the vegetables in the chamber 29 for the purpose of washing particles off the vegetables and lubricating the vegetables. Alternatively, the fluid in the cleaning system may be isolated from the fluid in the system that sprays liquid on the vegetables.

The primary goal of the upper assembly 10 is to clean the sheet metal surfaces around the peeling rolls. Cleaning from the top side provides access to most of the sheet metal while water and peel residue run down vertical surfaces and into the drain pan 7 below. The matter cleaned from the sheet metal surfaces may be from normal operation, from the cleaning process or both.

The primary objective of the lower assembly 20 is to clean the peeling rolls 8. The lower spray bar assembly 20 may utilize a flexible high-pressure hose (not shown) to facilitate the travel displacement of the spray bar 26 relative to the remainder of the machine and/or the source of pressurized liquid, which may be a liquid reservoir, a pump, valves, conduit and a pressure control system. As the spray bar 26 is displaced, as accommodated by the flexible hose, at least a portion of all the peeling rolls 8 adjacent the nozzles 28 are cleaned simultaneously. As the spray bar 26 is displaced along the rolls 8, and as the rolls rotate, desirably all working surfaces of the rolls 8 are cleaned of undesirable matter.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. An apparatus for cleaning multiple cylindrical rolls that are disposed along a curve that has at least a bottom side and a lateral side, wherein a chamber is defined within and above the rolls, each of the rolls having a peripheral working surface and a longitudinal axis about which each roll is configured for rotation, the apparatus comprising:
   (a) a spray bar disposed on an opposite side of the rolls from the chamber and having at least one nozzle directed toward the rolls and configured for spraying liquid toward the working surfaces that are disposed outside of the chamber; and
   (b) at least one prime mover drivingly linked to the spray bar and configured for displacing the spray bar along the longitudinal axes of the rolls.

2. The apparatus in accordance with claim 1, further comprising at least one drive rail aligned substantially parallel to the longitudinal axes of the rolls, the at least one drive rail extending from about a first end of the rolls to about a second, opposite end of the rolls.

3. The apparatus in accordance with claim 2, further comprising a stationary upper nozzle disposed above the rolls in operable orientation and wherein the at least one drive rail is disposed adjacent the bottom side of the curve and the spray bar is disposed adjacent the lateral side of the curve.

4. The apparatus in accordance with claim 2, wherein the at least one drive rail comprises first and second drive rails, and wherein the spray bar is slidably mounted to the first and second drive rails and extends adjacent at least the bottom side and the lateral side of the curve.

5. An apparatus for cleaning a food-processing machine having multiple cylindrical rolls disposed along a curve that has at least a bottom side and a lateral side, wherein a chamber is defined within and above the rolls, each of the rolls having a peripheral working surface configured for contacting food products in the chamber and a longitudinal axis about which each roll is configured for rotation, the apparatus comprising:
   (a) at least one drive rail mounted to the food-processing machine and aligned substantially parallel to the longitudinal axes of the rolls, the at least one drive rail extending from about a first end of the rolls to about a second, opposite end of the rolls;
   (b) a spray bar slidably mounted to the at least one drive rail and extending to an opposite side of the rolls from the chamber, the spray bar having at least one nozzle that is in fluid communication with a source of liquid and is directed toward the rolls for spraying liquid onto the peripheral working surfaces that are disposed outside of the chamber; and
   (c) at least one prime mover drivingly linked to the spray bar and configured for displacing the spray bar along the at least one drive rail on a path substantially parallel to the axes of the rolls.

6. The apparatus in accordance with claim 5, further comprising a stationary upper nozzle disposed above the rolls in operable orientation and wherein the at least one drive rail is disposed adjacent the bottom side of the curve the spray bar is disposed adjacent the lateral side of the curve.

7. The apparatus in accordance with claim 5, wherein the at least one drive rail comprises first and second drive rails, and wherein the spray bar is slidably mounted to the first and second drive rails and extends adjacent at least the bottom side and the lateral side of the curve.

* * * * *